United States Patent
Germann

[15] 3,667,097
[45] June 6, 1972

[54] METHOD FOR MAKING A BALL BEARING

[72] Inventor: Albert G. Germann, North Caldwell, N.J.

[73] Assignee: G & H Mechanical Laboratory, Inc., Township of Wayne, Passaic County, N.J.

[22] Filed: Nov. 9, 1971

[21] Appl. No.: 197,085

Related U.S. Application Data

[62] Division of Ser. No. 86,772, Nov. 4, 1970, Pat. No. 3,633,982.

[52] U.S. Cl. .........................................29/148.4 A, 308/191
[51] Int. Cl. ....................................B23p 11/00, F16c 19/02
[58] Field of Search........29/148.4 A, 434, 148.4 R, 148.4 D; 308/191

[56] References Cited

UNITED STATES PATENTS 3,418,704  12/1968  Oddsen..........................29/148.4 A Primary Examiner—Thomas H. Eager
Attorney—Ralph R. Roberts

[57] ABSTRACT

There is disclosed a method for manufacturing a ball bearing in which the inner race members are made of sheet metal so as to provide a precision bearing of very low cost. The sheet metal ball bearing of this invention is contemplated to be made with three different styles of internal inner race members disposed to be attached to or used with office furniture, home appliances, conveyors, automotive devices and the like by three different means. Attachment of the bearings may be by spot welding, staking, spinning, bolting, riveting, in press fit seats and other conventional means. These ball bearings are commonly designated as unground cageless bearings wherein the balls are arranged in the raceway with the balls in substantially tangential circumferential engagement with each other so as to provide a bearing having a determined amount of play after the bearing is assembled. The manufacture of the ball bearings is with an "in line" assembly system or by a rotary table system. In either system the bearing components are carrier through several stations for assembly to a determined configuration. These bearings are contemplated as having an outer flange drawn to a determined diameter which is merely a matter of selection. Size change of this diameter is accomplished by changing of the dies for the production of an outer blank diameter and for drawing the flange to a determined outer diameter. These bearings have inner and outer members which are of sheet metal and after assembly the bearings may be case hardened.

9 Claims, 15 Drawing Figures

PATENTED JUN 6 1972 3,667,097
SHEET 1 OF 2
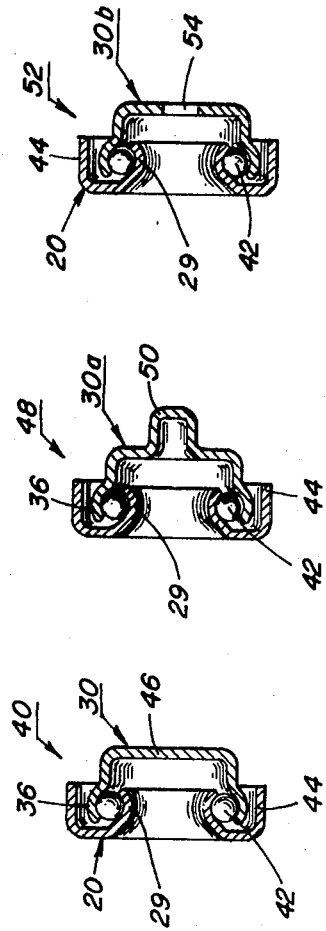
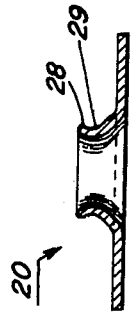
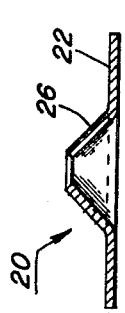
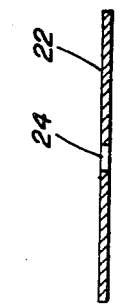
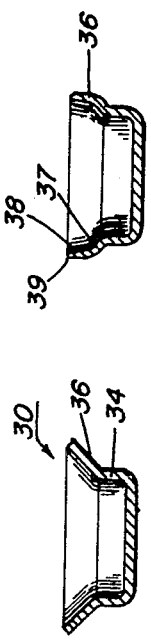
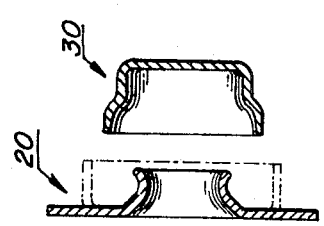

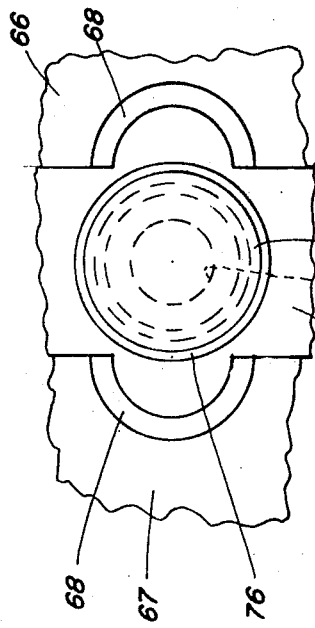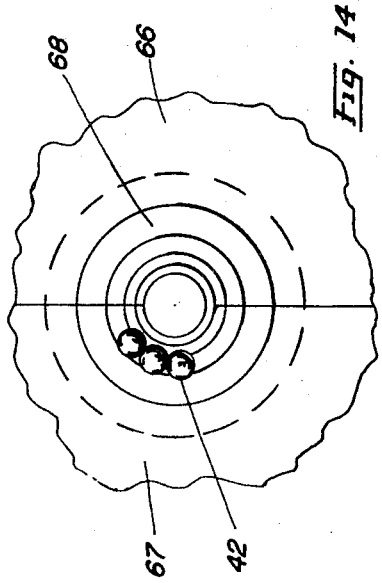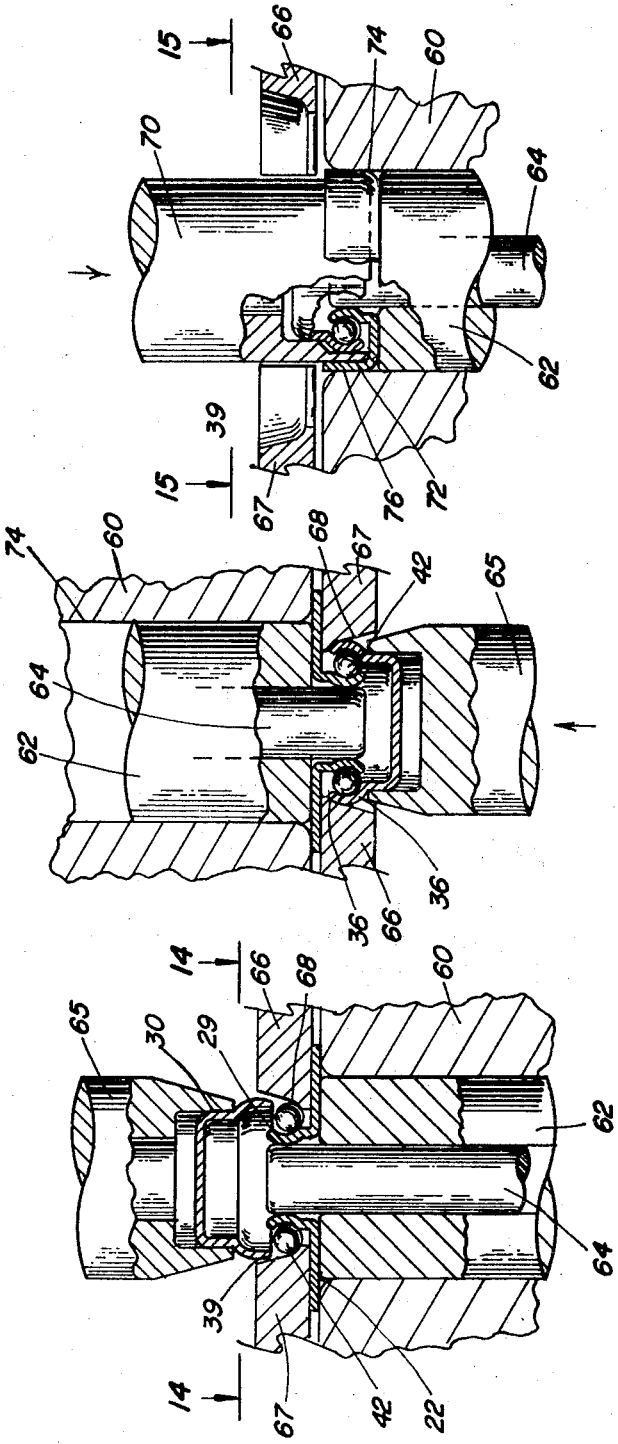

METHOD FOR MAKING A BALL BEARING

CROSS REFERENCE TO RELATED APPLICATION

This is a division of application Ser. No. 86,772 filed Nov. 4th, 1970, now U.S. Pat. No. 3,633,982, patented Jan. 11, 1972.

BACKGROUND OF THE INVENTION

1. Field of the Invention

With reference to the classification of art as established by the U. S. Patent Office this invention pertains to the class entitled, "Metal Working" and in particular to the subclass of "-processes of mechanical manufacture" particularly pertaining to "balls, rolls, races and cages". This invention also pertains to the class entitled, "Machine Elements, Bearings and Guides", and in particular to the subclass of "anti-friction bearings", and more particularly to "ball bearings", and even more particularly to "hub structure".

2. Description of the Prior Art

Inexpensive anti-friction bearings for use in home appliances, office furniture such as file cabinets and the like, are of course well known and have been shown in many U.S. patents. In general these bearings in addition to being of low cost have generally been made with such a wide tolerance and quality assembly that an excessive amount of play is present or develops early in the use of the bearing. For the reasons of economics and to improve the competitive position of various manufacturers of office furniture, roller conveyors and the like users of mass produced bearings, there is a great need for a sheet metal bearing of very low cost and having a controlled amount of play. Precision ball bearings, of course, are well known but generally require cages and in general the bearings so made require that the balls be placed in the race in a particular arrangement. With or without cages such bearings have precision ground raceways and are slowly produced and are expensive.

In the present invention it is contemplated that a semiprecision bearing having a controlled amount of play is made with the inner and outer members of drawn sheet metal. The bearing as hereinafter more fully described is made in an automatic manner and method with the precision of the bearing being a matter of tool control and design.

SUMMARY OF THE INVENTION

This invention may be summarized at least in part with reference to its objects.

It is an object of this invention to provide, and it does provide, an improved ball bearing and method of making the same, wherein the inner and outer race members are of drawn sheet metal and wherein the assembly may be economically and automatically produced.

It s a further object of this invention to provide, and it does provide, a bearing whose mounting characteristics may be readily changed by a change in the drawing dies used to form the inner and outer race members.

It is a further object of this invention to provide, and it does provide, a bearing made by an improved method in which an automatic assembly provides a ball bearing of controlled economical construction; the assembly providing the steps of receiving and positioning the inner and outer members, as well as receiving the balls from a precision dispenser, and then forming the race member portions over the balls to enclose the balls.

The bearing of this invention is of a simple construction wherein both the inner and outer race members are preferably of sheet metal. The inner member is selected from one of three configurations while the outer member is usually formed with a flange which is drawn to a determined size. This bearing is preferably assembled in automatic equipment of novel construction and operation. The balls of the bearing are retained in a cageless raceway which is drawn and formed to retain the bearing balls with a determined degree of play. In this bearing both the outer and inner raceways are made so as to provide a full annular inner and outer cup member in the manner of construction of precision bearings.

The construction of this bearing is quite novel in that the inner member provides the outer raceway for the balls and the outer member provides the inner raceway for the balls. This permits the inner member to be much larger than previously known bearings having select metal members. These bearings are usually commercially produced and sold as "stamped unground bearings" with the inner and outer members "case hardened throughout." In a conventional manner presently commercially available, the bearings of this invention are usually heat treated after assembly. The depth of case produced on the metal parts and balls is usually about three- to five-thousandths of an inch.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvements. For this reason there has been chosen a specific embodiment of the tooling for making and assembling the ball bearing. Three inner members are shown and each is adapted for use in a ball bearing assembly. The assembly tools show a preferred means for controlling the amount of play in the bearing assembly. This specific embodiment, and alternate embodiments of the inner member have been chosen for the purposes of illustration and description as shown in the accompanying drawings wherein:

BRIEF DESCRIPTION OF THE DRAWINGS

FIG. 1 represents a sectional view showing, in a displaced condition, the inner and outer members of the bearing of this invention prior to their assembly into a bearing and the placing of the balls therein;

FIG. 2 represents a sectional view showing an assembled ball bearing wherein the bearing inner member is disposed to be mounted by spot welding and the like to a support member such as is found in office furniture and the like;

FIG. 3 represents a sectional view showing an assembled ball bearing similar to the bearing of FIG. 2 but with this inner member adapted for mounting to a support member as by riveting, stud welding or staking after mounting in a hole;

FIG. 4 represents a sectional view of an assembled ball bearing similar to the bearing of FIG. 2 but with this inner member having an aperture adapted for mounting the bearing to a support member by means of a bolt, rivet or pin;

FIG. 5 represents a sectional view of a flat disc of sheet metal from which the inner or center member may be formed;

FIG. 6 represents a sectional view of the disc member of FIG. 5 in an intermediate formed condition;

FIG. 7 represents a sectional view of the inner or center member of FIG. 6 in its formed condition prior to assembly into a ball bearing;

FIG. 8 represents a sectional view of a flat disc of sheet metal from which the outer member may be formed, this disc has a center aperture permitting the central portion of the disc to be drawn by die forming means;

FIG. 9 represents a sectional view of the flat disc of FIG. 8 with the central portion of the outer member in a partially drawn condition;

FIG. 10 represents a sectional view of the outer member of FIG. 8 with the central portion thereof in a final drawn condition prior to and ready for assembly into a ball bearing;

FIG. 11 represents a sectional view, partly diagrammatic, showing the bearing components arranged in assembly tooling for one of the first stages of the preferred assembly operation;

FIG. 12 represents a sectional view, partly diagrammatic and showing the assembly tooling of FIG. 11 in an inverted condition with the bearing now assembled to a semi-finished condition;

FIG. 13 represents a sectional view partly diagrammatic, and showing the assembly tooling of FIG. 12 again inverted and with the flange of the outer member drawn to a determined diameter;

FIG. 14 represents a plan view, partly diagrammatic, looking at the bearing components and assembly tooling as arranged in FIG. 11, the view taken on the line 14—14 and looking in the direction of the arrows, and FIG. 15 represents a plan view, partly diagrammatic, looking at the assembled bearing in a finished condition in the assembly tooling as arranged in FIG. 13, the view taken on the line 15—15 and looking in the direction of the arrows.

In the following description and in the claims various details will be identified by specific names for convenience; these names however, are intended to be generic in their application. Corresponding reference characters refer to like members throughout the several figures of the drawings.

The drawings accompanying, and forming part of, this specification disclose certain details of construction for the purpose of explanation of the broader aspects of the invention, but it should be understood that structural details may be modified in various respects without departure from the concept and principles of the invention and that the invention may be incorporated in other structural forms than shown.

DESCRIPTION OF THE PREFERRED EMBODIMENT

Referring now in particular to the drawings in detail, it is to be noted that in FIG. 1 the inner and outer bearing members are shown in sectional detail and are in displaced position from one another. The ball members of the bearing are not shown. It is to be noted that the bearings as shown in FIGS. 1 through 4 have the center or inner member formed with its ball retaining portion providing the outer raceway portion of the bearing whereas the outer bearing member is formed so that its ball retaining portion provides the inner raceway portion of the bearing.

As seen particularly in FIG. 1 an outer bearing member 20 is drawn and formed in steps shown in particular in FIGS. 8 through 10. This outer member is made from a sheet metal blank or disc 22 which is usually punched or blanked from a strip of metal. This blank has a determined outer diameter and an aperture 24 punched in the center portion of this blank. This blank 22 is advanced to a forming station where its center portion is drawn into a cone position 26 which is the initial step in the forming of the ball retaining raceway portion of this outer bearing member. This outer member 20, as seen in FIG. 10, has the cone portion 26 of FIG. 9 shaped by an additional forming step so that an upper flared portion 28 is drawn outwardly to form an arcuate inner raceway 29 disposed to retain the determined number of balls to be hereinafter mounted in the bearing.

A center member 30 of the bearing assembly is also contemplated to be made of sheet metal. A blank or disc 32 of determined outer diameter as shown in FIG. 5 is usually blanked from a sheet metal strip after which the disc is advanced to a forming station whereat it is drawn to provide a cup portion 34 which joins or terminates at an outer tapered portion 36. After this initial shaping this outer tapered portion 36 is drawn to the shape of FIG. 7 where inner arcuate portion 37 forming a portion of the final raceway is sized so as to receive a determined number of balls of the bearing. From the portion 37 the side wall is formed to provide a straight inner wall portion 38 extending to the outer edge of the bearing. The outer lip edge portion 39 is reduced in thickness by tapering inwardly to make the edge thinner in section for easy rolling of this outer portion around the balls of the bearing in a manner more fully hereinafter described.

Referring now in particular to FIG. 2 there is shown an assembled bearing 40 which includes the outer member 20 and the inner or center member 30 and with a determined number of balls 42 retained by the inwardly curved section 36 which has been formed to complete the outer raceway portion of member 30. The arcuate portion 29 of outer member 20 provides the inner raceway of the bearing as assembled. After the bearing has been assembled the outer rim portion 44 of member 20 is formed to provide an outer flange which may be a rolling surface for the bearing or may be pressed into a tube or recess to position and seat the bearing in a support member. It is to be noted that as seen in the bearing of FIG. 2 that member 30 has a center wall portion 46 which is left as a flat member of sheet metal. This provides a means by which the bearing may be spot welded to another sheet metal support member to fasten and position the bearing in a desired relationship to other apparatus.

Referring next to FIG. 3 in which the assembled bearing is generally identified as 48, this bearing is substantially the same as the bearing shown in FIG. 2 and with the balls 42 shown in a retained condition. In FIG. 3 the center portion of the inner member 30a is displaced outwardly into a drawn center support piece 50 which is sized to be a snug fit in a drilled or punched hole in the support member to which the bearing is to be mounted. After the bearing is mounted in the hole, the drawn center support piece 50 may be soldered, spun, riveted, welded, or staked to the support member by conventional and known assembly methods and tools.

Referring next to FIG. 4 in which the bearing is generally identified as 52, it is to be noted that this bearing is shown as having the outer member 20 formed with an outer flange diameter 44. The outer member has its inner race 29 disposed to retain a grouping of balls 42 in the same manner as does the bearing of FIG. 2. However, the center support member 30b instead of having the drawn center support piece 50 of FIG. 3 has, instead, an aperture 54 punched or drilled in the center portion of member 30b. This aperture permits a bolt, rivet or the like to engage this aperture of the center support portion and also a mating hole in a support beam or member so that the bearing may be fixedly attached to this support member by means of a bolt, rivet and the like and by this means to position the bearing in the desired relationship.

Assembly of the Bearing of FIGS. 2, 3 and 4

It is contemplated that any of the configurations of the bearings as shown in FIGS. 2, 3 and 4 may be assembled automatically and at a high speed. In the present invention it is contemplated that the bearings are assembled by means of and in apparatus advanced in an intermittent manner. This assembly apparatus may be either a rotary or turntable having selected stations which are, of course, at least plural in number such as five, six or seven stations. It is also contemplated that instead of a turntable assembly means that the bearings may be assembled with an "in line" apparatus in the manner of a conveying system in which each of the components is fed to a determined station. As the bearing assembly moves along the conveyor the components and assembly operations are sequentially performed at the several stations.

Assuming that the following description is related to a turntable assembly device, reference is made to FIGS. 11 through 15, wherein it is contemplated that a support base 60 is disposed to slidably receive a support pin 62 whose outer diameter is the determined outer diameter of the bearing flange 44. Slidably carried in support pin 62 is a center post 64 which is disposed to slidably engage and position the inner diameter of the raceway portion 29 of the outer member 20. At a first assembly station prior to the assembly station of FIG. 11 an upper shaping plunger 65 and the center member 30 are absent. Split ball guides 66 and 67 are carried in slides or ways, not shown, and are moved into position to rest upon the outward extending flange portion 22 of the outer member 20. These guides 66 and 67 are provided with a contoured recess 68 disposed to receive and retain a plurality of balls 42 which in the bearing shown number thirteen balls which are three-sixteenths of an inch in diameter. These balls are delivered from a dispenser after the split guides 66 and 67 have been slid or advanced into a mating relationship above the flange portion 22. The contoured recess 68 provides an open-topped cup or retaining trough into which the balls 42 are dropped by means of a "Precision Ball Drop" such as is shown in U.S. Pat. No. 3,378,166 which issued Apr. 16th 1968 in the name of Howard S. Hoffman or by means of a "Dispenser for Like-Sized Balls" as shown in U.S. Pat. No. 3,552,600 which issued Jan. 5th 1971 also in the name of Howard S. Hoffman. During the delivery of these balls the shaping plunger 65 and the center member 30 are absent from the station.

After the balls have been dispensed into the trough by means such as the above-described ball dispensing apparatus it is contemplated that the support base 60, pin 62 and post 64, guides 66 and 67 and balls 42 in member 20 are advanced to the next station. At this next station the upper shaping plunger 65 is fed to and is brought to the position and condition as seen in FIG. 11 and with member 30 retained therein is pushed into recess 68 sufficiently for the outer lip edge 39 to engage the balls 42 to hold the balls in a loosely retained condition with the inner member portion 29 of member 20.

With the bearing and assembly components in this condition the above-identified assembling members including members 60, 62 and 64 as well as plunger 65 and guides 66 and 67 as well as the bearing components are rotated 180° to the position of FIG. 12 whereat the shaping plunger 65 is advanced in the direction of the arrow to cause the outer tapered edge or end 36 to be pushed into the taper provided by the recess 68 so that the end 36 is curved or curled inwardly to complete the shaping of the outer raceway and provided a sized raceway around the balls 42. At this station and after completion of the forming or curving of the end 36 with the forward motion of the member 65 in the direction of the arrow, member 65 is moved counterflow thereto and is removed from the bearing after which the base 60 with pin 62, post 64, and with the bearing assembled therein and retained by the cup members 66 and 67, are advanced to the next forming station.

During or after the movement of the assembly apparatus and bearing to this forming station the support 60 with plunger 62, post 64 and the bearing carried therein are again rotated 180° to the condition of FIG. 11. The retained bearing is also rotated with the tools after which the cup-shaped portion members 66 and 67 are moved outwardly away from the bearing. An upper plunger 70 is now moved toward the bearing with a forming ring 72 carried by and as a part of plunger 70 entering the bearing beside the raceway portion 39. Plunger 70 now moves downwardly causing the outwardly extending flange portion 22 to be urged into the bore 74 of base 60 to form flange portion 76 on the bearing.

With the bearing now formed, plunger 70 is drawn upwardly from the bearing; post 64 is drawn downwardly to release the center portion of the bearing, and finally member 62 is moved upwardly to push flange portion 76 from bore 74. The bearing, now complete, is then discharged to accumulating means. The support base 60 is then brought again to the condition of FIG. 11 whereat another bearing is begun to be assembled.

Whether as a rotary assembly system or as an "in line" system it has been found desirable to invert the partially assembled bearing in order to form the end 36 into a raceway of determined size. By inverting, the balls 42 lie in the preformed raceway portions in the desired spaced position so that the inturning or edge or end 36 can be precisely accomplished without jamming the balls into the sheet metal parts with a resulting deformation or destruction of prior shaped raceways.

The case hardening of the sheet metal parts and balls is in accordance with established procedures and after the assembly steps of FIGS. 11 through 13.

The size of the bearing, the number of balls, the type of mounting, the stiffness of the sheet metal are all matters of selection. The demands on and use of the bearing are factors in the selection of design parameters and are determined at the time of manufacture of the bearing.

Terms such as "left", "right", "up", "down", "bottom", "top", "front", "back", "in", "out" and the like are applicable to the embodiments shown and described in conjunction with the drawings. These terms are merely for the purposes of description and do not necessarily apply to the position in which the bearing may be construction or used.

While a specific method of bearing manufacture has been disclosed and three bearing designs have been illustrated the method of assembly and bearing design is not limited to the specific embodiments shown but departures therefrom may be made within the scope of the accompanying claims and protection is sought to the broadest extent the prior art allows.

What is claimed is:

1. A method of assembling a ball bearing whose inner and outer members are of sheet metal and with said inner and outer members formed to receive a multiplicity of balls and retain these balls in raceways formed in the inner and outer members, said method including the steps of: (a) blanking a disc from sheet metal of determined thickness for use in the forming of an outer member; (b) forming a centrally disposed annular raceway in said outer member disc, said annular raceway disposed to provide the inner raceway for the walls of the ball bearing, and with the remaining disc providing at least a substantially flat flange portion; (c) blanking a disc from sheet metal of determined thickness for use in forming an inner member; (d) forming said inner member disc into a cup-shaped configuration wherein the annular wall is formed with at least two diameter portions with the larger diameter portion being the outer portion terminating at the open end and with the transition portion between the inner and outer annular portions being shaped to provide a portion of the outer raceway of the ball bearing; (e) positioning the outer member on a support base and in an upwardly directed condition; (f) positioning a pair of split guides on the flange portion of the outer member so as to provide a contoured recess disposed to provide an outer retainer for a group of like-sized balls, this recess and the inner raceway of the outer member in cooperative alignment and providing an open top ball-retaining annular groove of determined width and diameter; (g) dispensing a multiplicity of like-sized balls into said open top ball-retaining annular groove; (h) moving the inner member to the retained outer member and positioning the larger annular wall portion thereof within the contoured recess of the split guides and to the outside of the ring of like-sized balls; (i) pushing the open end of the annular wall portion of the inner member further into a tapered portion of said contoured recess provided by the split guides so as to turn the open end portion inwardly and form a ball-retaining raceway of the larger diameter annular wall portion and with the grouping of balls enclosed between the inner and outer raceways, and (j) withdrawing the split guide members from a retaining condition of the outer member.

2. A method of forming a ball bearing as in claim 1 wherein in the forming of the cup shaped configuration of the inner member there is provided the step of thinning the outer edge portion adjacent the open end to provide a diminishing cross-section.

3. The method of forming a ball bearing as in claim 1 which includes the further step of forming an annular outer flange on the outer member after the balls of the bearing have been enclosed in the raceway portions of the inner and outer members.

4. The method of forming a bearing as in claim 1 wherein after the inner member is formed and prior to moving the inner member there is included the step of seating the inner member in a shaping plunger having pocket sized to snugly retain the smaller annular diameter of the inner member and with the end of the shaping plunger adapted to engage the transition portion of the inner member while being sized to enter the contoured recess of the closed split guides.

5. The method of forming a bearing as in claim 4 wherein the withdrawing of the split guide members is by withdrawing the split guides in a path normal to the plane of the ball raceways.

6. The method of forming a ball bearing as in claim 1 wherein after the inner member has been moved into the contoured recess there is provided the step of inverting the assembly tooling so that the inner member becomes the lower of the two bearing members after which the inner member is pushed upwardly to form the open end of the inner member into an inwardly curved portion thus completing the forming of the retaining raceway.

7. The method of forming a ball bearing as in claim 6 wherein after the raceway of the inner member has been formed into an inwardly curved retaining raceway there is provided the step of again inverting the assembly tooling and after withdrawing the split guide members from in way of the outer member there is provided the step of bringing an upper plunger in way of the outwardly extending flange portion of the outer member and then advancing this upper plunger toward and into a bore in the support base so as to form an annular outer flange on the outer member after which there is provided the additional steps of withdrawing the upper plunger from the base and ejecting the flanged bearing from the same bore.

8. The method of forming a ball bearing as in claim 1 wherein there is added the step of forming an aperture in the central portion of the inner member.

9. The method of forming a ball bearing as in claim 1 wherein there is added the additional step of forming the central portion of the inner member with a support portion drawn so as to provide a support pin adapted for mounting in a hole and then attaching by riveting, staking, spinning and the like.

* * * * *